US008200270B2

(12) United States Patent
Ariyur

(10) Patent No.: US 8,200,270 B2
(45) Date of Patent: Jun. 12, 2012

(54) METHOD FOR ADUSTING POWER AT A NODE

(75) Inventor: Kartik B. Ariyur, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1185 days.

(21) Appl. No.: 11/841,364

(22) Filed: Aug. 20, 2007

(65) Prior Publication Data
US 2009/0052371 A1 Feb. 26, 2009

(51) Int. Cl.
*H04B 7/00* (2006.01)
*H04W 36/00* (2009.01)

(52) U.S. Cl. ........ 455/522; 455/524; 455/442; 455/443; 455/453; 455/69; 455/67.11

(58) Field of Classification Search .................. 455/522, 455/524, 442, 443, 453, 69, 67.11
See application file for complete search history.

(56) References Cited

U.S. PATENT DOCUMENTS

| | | | |
|---|---|---|---|
| 5,333,175 A | 7/1994 | Ariyavisitakul | |
| 5,596,722 A | 1/1997 | Rahnema | |
| 5,930,684 A | 7/1999 | Keskitalo et al. | |
| 6,259,927 B1 * | 7/2001 | Butovitsch et al. | 455/522 |
| 6,442,615 B1 | 8/2002 | Nordenstam et al. | |
| 6,606,303 B1 | 8/2003 | Hassel et al. | |
| 6,778,839 B2 | 8/2004 | Valkealahti | |
| 6,795,865 B1 | 9/2004 | Bahl et al. | |
| 6,829,222 B2 | 12/2004 | Amis et al. | |
| 6,836,463 B2 | 12/2004 | Garcia-Luna-Aceves et al. | |
| 6,917,985 B2 | 7/2005 | Madruga et al. | |
| 6,931,257 B2 | 8/2005 | Shahidi et al. | |
| 6,961,310 B2 | 11/2005 | Cain | |
| 6,963,747 B1 | 11/2005 | Elliott | |
| 6,968,201 B1 | 11/2005 | Gandhi et al. | |
| 7,016,306 B2 | 3/2006 | Alapuranen et al. | |
| 7,027,402 B2 | 4/2006 | Hedden | |
| 7,035,221 B2 | 4/2006 | Furukawa et al. | |
| 7,085,290 B2 | 8/2006 | Cain et al. | |
| 7,111,074 B2 | 9/2006 | Basturk | |
| 7,159,035 B2 | 1/2007 | Garcie-Luna-Aceves et al. | |
| 7,162,250 B2 * | 1/2007 | Misra | 455/453 |
| 7,225,268 B2 | 5/2007 | Watanabe | |

(Continued)

OTHER PUBLICATIONS

Varadarajan et al., "Analytic Framework and QoS Adaptive Mechanisms for Achieving Transport Capacity Bounds in Multi-Hop Statically Routed IE", "First Annual Conference of ITA (ACITA)", 2007, Publisher: Honeywell Aerospace Advanced Technology Labs, Published in: Minneapolis, MN.

(Continued)

*Primary Examiner* — Wen Huang
(74) *Attorney, Agent, or Firm* — Fogg & Powers LLC

(57) ABSTRACT

In one embodiment, a method for distributed power control in a network is provided. The method determines a transmit power for a plurality of transmitting nodes such that signals sent from each of the transmitting nodes are received at a receiving node at a signal to interference plus noise ratio (SINR) set point. Additionally, the method increases the SINR at the receiving node of one or more transmitting nodes of the plurality of transmitting nodes, and decreases the SINR at the receiving node of one or more other transmitting nodes of the plurality of transmitting nodes; wherein a total increase in SINR by the one or more transmitting nodes is substantially equal to total decrease in SINR by the one or more other transmitting nodes.

16 Claims, 3 Drawing Sheets

U.S. PATENT DOCUMENTS

| | | |
|---|---|---|
| 7,266,386 B2 | 9/2007 | Kim et al. |
| 7,280,483 B2 | 10/2007 | Joshi |
| 7,295,856 B2 | 11/2007 | Agin |
| 7,333,827 B2 | 2/2008 | Biddiscombe et al. |
| 7,339,994 B2 | 3/2008 | Lin et al. |
| 7,340,268 B2 | 3/2008 | Oh et al. |
| 7,342,907 B2 | 3/2008 | Kim et al. |
| 2002/0105937 A1 | 8/2002 | Takeuchi et al. |
| 2002/0173309 A1 | 11/2002 | Shahidi et al. |
| 2002/0196802 A1 | 12/2002 | Sakov et al. |
| 2003/0033350 A1 | 2/2003 | Arimilli et al. |
| 2003/0045318 A1 | 3/2003 | Subrahmanya |
| 2003/0083082 A1 | 5/2003 | Lundby |
| 2003/0163554 A1 | 8/2003 | Sendrowicz |
| 2004/0005906 A1* | 1/2004 | Okumura et al. ............. 455/522 |
| 2004/0052210 A1 | 3/2004 | Kasera et al. |
| 2004/0073701 A1 | 4/2004 | Huang et al. |
| 2004/0142692 A1 | 7/2004 | Schwarz et al. |
| 2004/0146007 A1 | 7/2004 | Saadawi et al. |
| 2004/0209635 A1 | 10/2004 | Hsu |
| 2005/0050220 A1 | 3/2005 | Rouyer et al. |
| 2005/0053005 A1 | 3/2005 | Cain et al. |
| 2005/0136961 A1 | 6/2005 | Simonsson et al. |
| 2005/0143012 A1 | 6/2005 | Gu et al. |
| 2006/0040696 A1 | 2/2006 | Lin |
| 2006/0092870 A1 | 5/2006 | Kondou et al. |
| 2006/0160555 A1 | 7/2006 | Kobayashi et al. |
| 2006/0183495 A1 | 8/2006 | Soliman |
| 2007/0105581 A1 | 5/2007 | Ariyur |
| 2007/0184839 A1* | 8/2007 | Igarashi et al. ............... 455/436 |
| 2008/0032733 A1 | 2/2008 | Hays |
| 2009/0069057 A1 | 3/2009 | Haartsen et al. |

OTHER PUBLICATIONS

Scherber, Dzulkifli, "Distributed Computation of Averages Over Adhoc Networks", IEEE Journal on Selected Areas in Communication, May 2005, pp. 776-787, vol. 23, No. 4, Publisher: IEEE.

Scherber et al., "Distributed Computation of Averages Over Ad Hoc Networks", "IEEE Journal on Selected Areas in Communications", Apr. 2005, pp. 776-787, vol. 23, No. 4, Publisher: IEEE, Published in: US.

* cited by examiner

METHOD FOR ADUSTING POWER AT A NODE

BACKGROUND

In many current wireless cellular systems, the transmit power levels from a mobile unit to a base station of a system are controlled. For example, in some multiple-access systems utilizing a spread spectrum technology, power is controlled at each mobile unit so as to reduce interference caused by the transmissions of one mobile unit upon the transmissions of other mobile units using the same channel. Controlling the transmit power also helps to reduce power at the mobile units, which are generally battery powered. The transmission power of each mobile unit is set high enough such that signals are received at the base station at the desired signal to interference plus noise ratio (SINR), yet low enough to meet the aforementioned goals of interference and power reduction.

To determine the transmission power of each mobile unit, a SINR set point is established for the system. Generally, the SINR set point is based on the minimum data rate required by the system. In wireless communications, the maximum data rate of transmission between two mobile units is directly proportional to the SINR between the two units. A low SINR limits the maximum data rate, because data received with a low signal to noise ratio requires a large amount of processing to extract the transmitted signal from the received waveform. Likewise, a high SINR allows for a high data rate of transmission, because the received waveform requires little processing to extract the transmitted signal. When a system establishes its SINR set point, therefore, the data rate required for proper throughput is determined and a minimum SINR is established to achieve the required data rate. A system SINR set point is then set at or slightly above this minimum SINR. In many systems, the set point of the system is modified over time to account for changes in the number of users in the system and/or environmental phenomena.

Once the SINR set point is determined, the transmit power level for each mobile unit can be established so that a signal sent from a mobile unit is received by the base station at the SINR set point. This is generally accomplished through feedback from the base station to each mobile unit regarding that mobile units received SINR. For example, when a mobile unit transmits a signal to the base station, the base station measures the SINR of the signal and either notifies the mobile unit of its SINR or directly commands adjustment of transmission power of the mobile unit. Either way the mobile unit will set its transmission power such that signals are received at the SINR set point. Since different mobile units may transmit at differing distances from the base station, different mobile units may transmit at different power levels to achieve the SINR set point.

In general, each mobile unit transmits at the minimum power level needed to achieve the SINR set point. This minimizes the amount of interference caused by each mobile unit upon signals of other mobile units. Additionally, when transmitting at the minimum power level, users of the mobile units obtain the maximum talk time from their battery powered mobile units.

Although these current systems succeed in reducing interference and power consumption, these systems cause inefficiencies in network operations, because they are designed to reduce cost and increase simplicity of the system rather than to maximize performance. For the reasons stated above, and for other reasons stated below which will become apparent to those skilled in the art upon reading and understanding the present specification, there is a need in the art for a method for increasing the performance of a wireless network.

SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. In one embodiment, a method for distributed power control in a network is provided. The method determines a transmit power for a plurality of transmitting nodes such that signals sent from each of the transmitting nodes are received at a receiving node at a signal to interference plus noise ratio (SINR) set point. Additionally, the method increases the SINR at the receiving node of one or more transmitting nodes of the plurality of transmitting nodes, and decreases the SINR at the receiving node of one or more other transmitting nodes of the plurality of transmitting nodes; wherein a total increase in SINR by the one or more transmitting nodes is substantially equal to total decrease in SINR by the one or more other transmitting nodes.

BRIEF DESCRIPTION OF THE DRAWINGS

The present invention can be more easily understood, and further advantages and uses thereof are more readily apparent, when considered in view of the detailed description and the following figures in which.

In accordance with common practice, the various described features are not drawn to scale but are drawn to emphasize specific features relevant to the present invention.

DETAILED DESCRIPTION

In the following detailed description, reference is made to the accompanying drawings that form a part hereof, and in which is shown by way of illustration specific illustrative embodiments in which the method and system may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide for a method for improving the performance of a network by modifying the received SINR of at least one transmitting node based on the amount of information to be transmitted by the at least one node. Other embodiments of the present invention provide for a method for improving the performance of a network by modifying the data rate of transmission for at least one transmitting node based on the amount of information to be transmitted by the at least one transmitting node. Still other embodiments of the present invention provide for a method for improving the performance of a network by increasing the received SINR of one or more transmitting nodes and decreasing the received SINR of one or more other transmitting nodes, such that the total increase in SINR is substantially equal to the total decrease in SINR.

Figure 1:
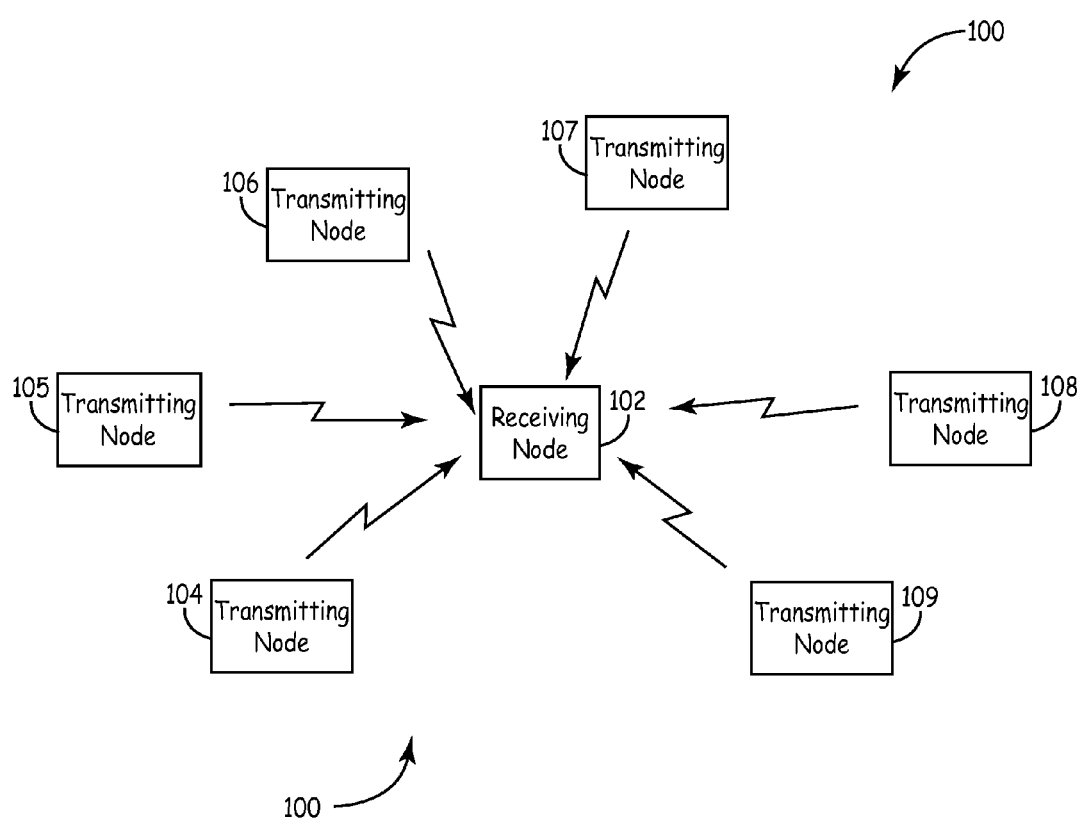
FIG. 1 illustrates one embodiment of a network.

FIG. 1 is a block diagram of one embodiment of a wireless network 100 in which a method of distributed power control is used. Network 100 is a one-hop network which includes a plurality of nodes 102, 104-109. Nodes 102, 104-109 generate and/or receive information for/from other nodes 102, 104-109. In one embodiment, nodes 102, 104-109 are mobile. In an alternative embodiment, nodes 102, 104-109 are fixed. In another alternative embodiment, nodes 102, 104-109 comprise a combination of fixed and mobile nodes. In this embodiment, nodes 102, 104-109 are substantially similar in function and design. Each node 102, 104-109 is capable of transmitting to and receiving from any other node 102, 104-109 that is within range of the node 102, 104-109. Although nodes 12, 104-109 of network 100 are capable of bi-directional communication between any two nodes, for illustrative purposes, one-way communication from nodes 104-109 to node 102 is shown. Node 102, therefore, has been illustrated as a receiving node and is currently receiving signals from the other nodes 104, 105, 106, 107, 108, and 109 which are illustrated as transmitting nodes.

In one embodiment, network 100 is a one-hop network, and transmitting nodes 104-109 communicate data by transmitting a signal to receiving node 102, accompanied by an address of the destination node of the signal. For example, when transmitting node 104 intends to send a message to receiving node 102, transmitting node transmits the message accompanied by an indication that receiving node 102 is the destination node of the message. Each node 102, 105-109 within range of transmitting node 104 receives the signal sent by transmitting node 104. Each node 102, 105-109 receiving the signal, then looks at the signal to determine if they are the destination node for the signal. Since in this example only receiving node 102 is the destination node, receiving node 102 decodes the message. Each other node 105-109 receiving the signal realizes that they are not the destination node and ignores the message. In one embodiment, nodes 102 and 104-109 communicate using a spread spectrum transmission technique. As an example, nodes 102 and 104-109 communicate using direct sequence spread spectrum (DSSS) in a low frequency band (100-500 MHz). For example, ultra-wide band (UWB), or code division multiple access (CDMA) could be used. In other embodiments, other transmission techniques and/or frequency bands could be used.

Although in this embodiment a wireless network is illustrated, in other embodiments, network 100 may be wired, or a combination of wired and wireless networks. Finally, although here network 100 is illustrated as a one-hop network, in other embodiments, network 100 can be a multi-hop network. Thus, in alternative embodiments, receiving node 102 functions as the hub of network 100 receiving and relaying transmissions between transmitting nodes 104-109. Receiving node 102 may also function as the network administrator, controlling and coordinating communication between nodes 104-109. In one embodiment, in addition to coordinating and controlling communication, receiving node 102 also generates original information and is the final destination of information from transmitting nodes 104-109. Additionally, in other embodiments, network 100 has more or fewer nodes than illustrated in FIG. 1.

In some embodiments, nodes 102 and 104-109 can include sensors, and voice and video communications equipment. The sensors can include video cameras, motion sensors, radars, microphones, or other sensing apparatus. In other embodiments, however, nodes 102 and 104-109 are devices other than sensors, and voice and video communication equipment. For example, in one alternative embodiment, receiving node 102 is an access point and transmitting nodes 104-109 are personal computers. In another alternative embodiment, receiving node 102 is a base station and transmitting nodes 104-109 are mobile users.

Since transmitting nodes 104-109 use a spread spectrum transmission technique, each transmission from a transmitting node 104-109 is seen as either noise or interference by receiving node 102 when receiving node 102 is attempting to decode a transmission from a different transmitting node 104-109. When each transmitting node 104-109 transmits information to receiving node 102 at the same time and on the same frequency as the other transmitting nodes 104-109 and receiving node 102 is attempting to processing the inputs from each transmitting node 104-109, the signals from transmitting nodes 104-109 which are not being decoded are seen as interference. When, however, each transmitting node 104-109 transmits information to receiving node 102 at the same time and on the same frequency and receiving node processes only the signal from a subset of the transmitting nodes (e.g. 104-105), signals from the other transmitting nodes (e.g. 106-109) are seen as noise. In either case, however, the other transmitted signals hinder the reception of receiving node 102. Furthermore, each additional transmitting node 106-109 that is transmitting adds additional noise/interference to a signal received at receiving node 102.

Figure 2:
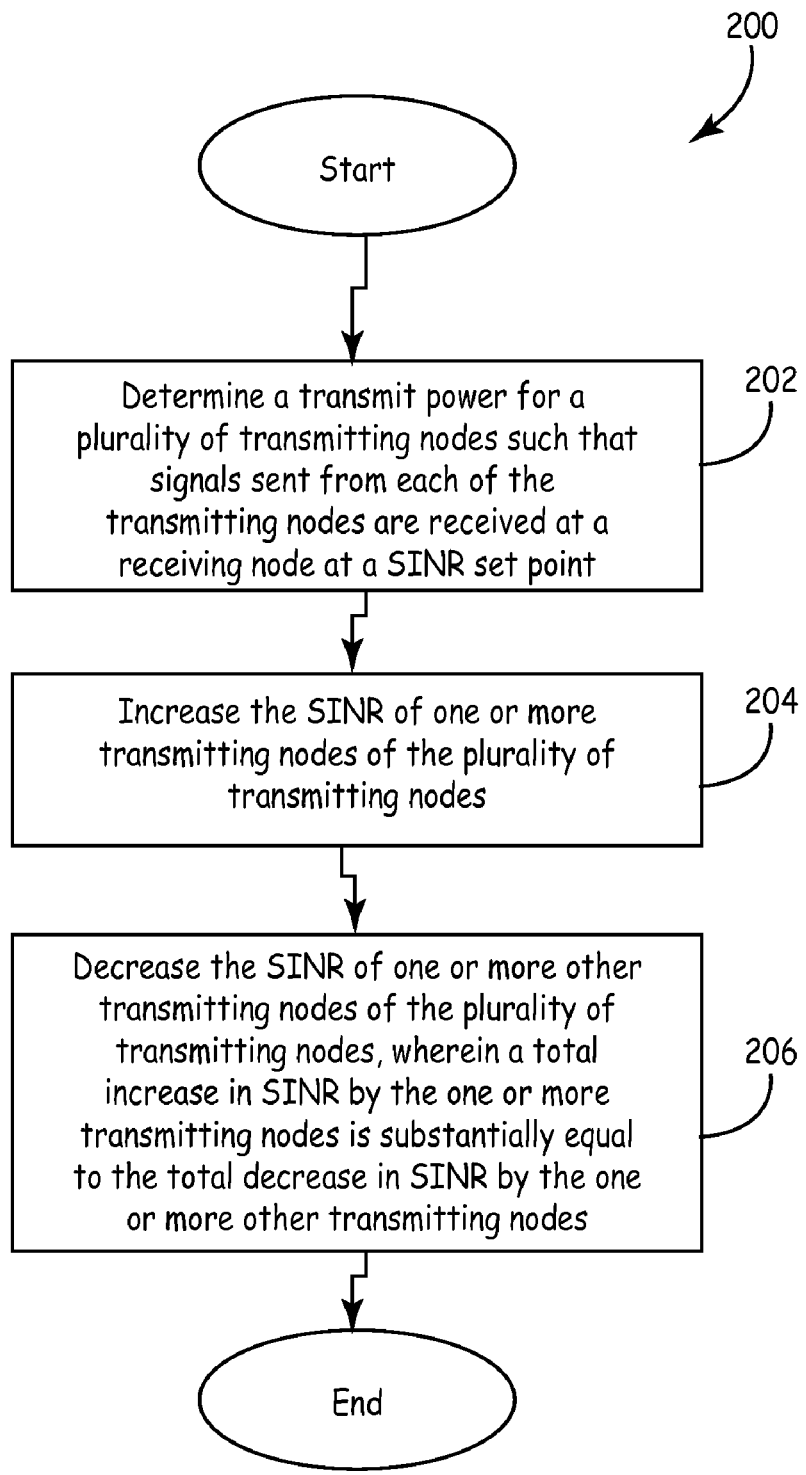
FIG. 2 illustrates one embodiment of a method for improving the performance of the network of FIG. 1.

Referring now to FIG. 2, one embodiment of a method 200 for a distributed power control in a network, such as network 100, is shown. Method 200 improves the performance of network 100 by allowing one or more transmitting nodes 104-109 to transmit at a higher data rate than the other transmitting nodes. Method 200 begins at step 202 where each node of a plurality of transmitting nodes determines a transmit power such that signals sent from each of the plurality of transmitting nodes are received at a receiving node at a SINR set point. The SINR set point is a selected SINR at which signals from each transmitting node are to be received at a receiving node. At block 204 of method 200, one or more transmitting nodes of the plurality of transmitting nodes increases its SINR set point. At block 206 of method 200, one or more other transmitting nodes of the plurality of transmitting nodes decreases its SINR set point. An algorithm controls the total increase in SINR and the total decrease in SINR among all the transmitting nodes such that the total increase in SINR is substantially equal to the total decrease in SINR. This maintains the average SINR for network 100 as seen by the receiving node at the SINR set point, while allowing improved network performance because higher priority transmitting nodes are allowed to transmit at a higher SINR.

Figure 3:
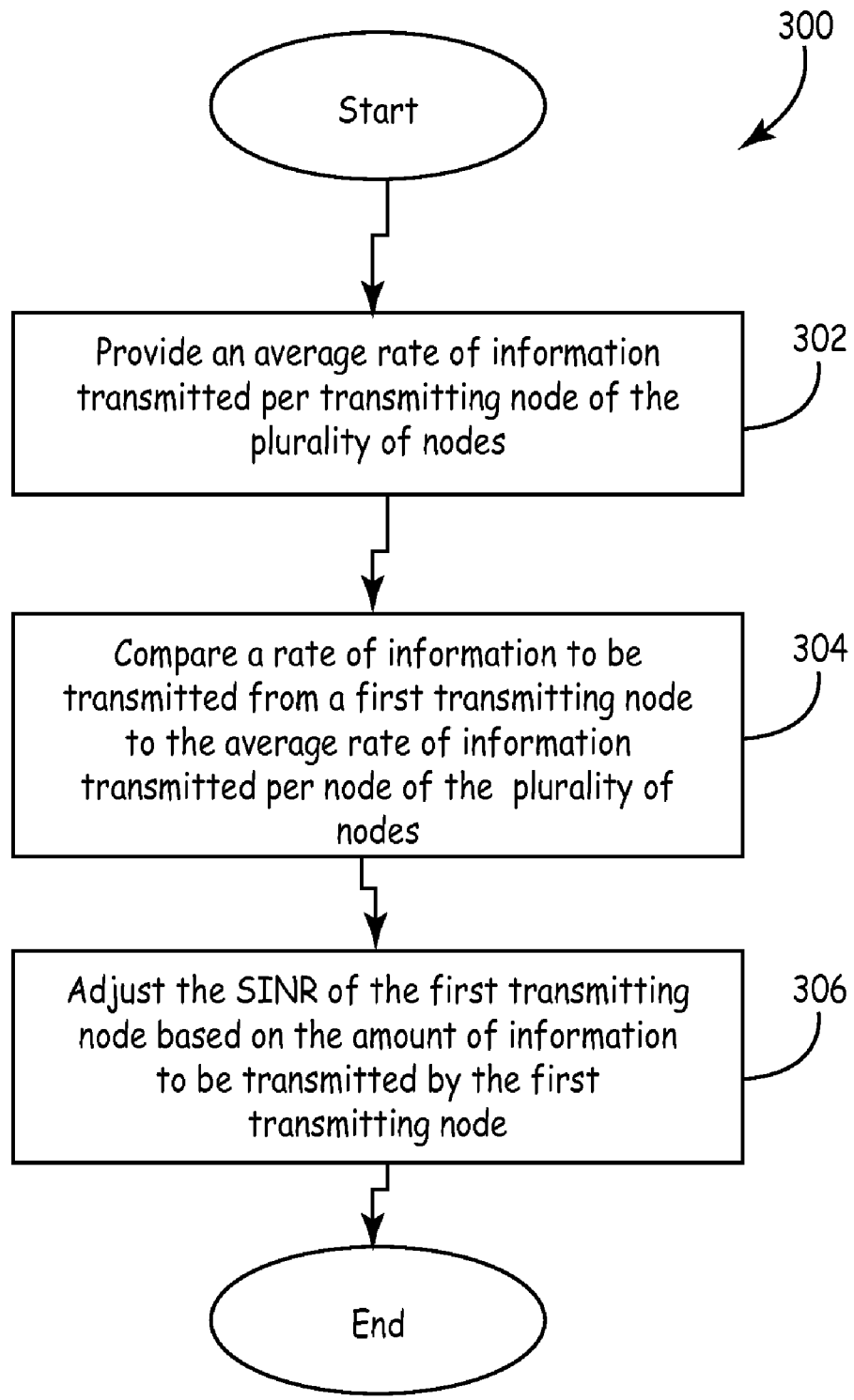
FIG. 3 illustrates one embodiment of another method for improving the performance of the network of FIG. 1.

FIG. 3 illustrates one embodiment of a method 300 for prioritizing transmitting nodes. Method 300 begins at block 302 where an average rate of information transmitted per transmitting node of the plurality of transmitting nodes is provided. In one embodiment, a receiving node calculates the average rate of information transmitted per transmitting node and communicates information relating to the average to each transmitting node. In another embodiment, a transmitting node calculates the average rate of information transmitted itself. Method 300 continues at block 304 where the average rate of information transmitted is compared with a rate of information to be transmitted from a first transmitting node. The result of this comparison is used in block 306 where the SINR of the first transmitting node is adjusted based on the amount of information transmitted by the first transmitting node.

In one embodiment, method 300 is used to determine which transmitting nodes of the plurality of transmitting nodes from method 200 increase their SINR and which transmitting nodes decrease their SINR. In this embodiment, block 306 refers to the increase (block 204) or decrease (block 206) of method 200. For example, if at block 304, the first transmitting node is determined to have a rate of information to be transmitted that is higher than the average, the first transmitting node has its SINR increased at block 204 of method 200. If, however, the first transmitting node has a rate of information to be transmitted that is lower than the average, the first transmitting node has its SINR decreased at block 206 of method 200. More detail regarding methods 200 and 300 shown in FIGS. 2 and 3 respectively is provided in the following description.

The following description of method 200 is with respect to transmitting node 104, however, it should be understood that each transmitting node 104-109 is similar, thus the description can apply to each transmitting node 104-109.

In one embodiment of method 200, the data rate of transmission of transmitting node 104 is increased by increasing the signal to interference plus noise ration (SINR) of transmitting node 104 such that signals are received at receiving node 102 with a higher SINR. As described previously, method 200 begins at block 202 where transmitting node 104 determines the initial transmit power required to transmit to receiving node 102. The transmit power of each transmitting node 104-109 is controlled to control the amount of noise caused by the signal of one transmitting node 104-109 on the signals of other transmitting nodes 104-109. To control the transmit power of transmitting nodes 104-109, a SINR set point of network 100 is determined. The SINR set point is a selected SINR at which signals from each transmitting node 104-109 are to be received at receiving node 102. In one embodiment, the SINR set point is determined based on the number of transmitting nodes in the network and is set at or near the lowest level at which receiving node 102 can properly decode signals from each of transmitting nodes 104-109 when each transmitting node 104-109 is transmitting simultaneously. In another embodiment, the SINR set point is established based on the saturation point of the front end of receiving node 102. For example, in one embodiment, the SINR set point is determined using the algorithm described in related patent application Ser. No. 11/269,383 titled "A SYSTEM AND METHOD TO PERFORM STABLE DISTRIBUTED POWER CONTROL IN A WIRELESS NETWORK" (referred to as the "'383 application") filed on Nov. 8, 2005 which is commonly owned by Honeywell. The '383 application is incorporated herein by reference.

Once the SINR set point of network 100 is determined, transmitting node 104 determines the minimum transmit power required such that a signal transmitted by transmitting node 104 is received at receiving node 102 at the SINR set point. It should be noted that the transmit power of transmitting node 104 required to meet the SINR set point may be different than the transmit power of other transmitting nodes 105-109 due to differences in the distance from each transmitting node 104-109 to receiving node 102 and/or other environmental factors.

In currently available systems, one cause of inefficiencies is that the network applies the same SINR to each transmitting node regardless of the particular situation of each transmitting node. Each transmitting node is limited to transmitting such that the signals are received at a receiving node at the SINR set point. Each node, therefore, is limited in its transmission data rate because they must transmit at the SINR set point regardless of the type or amount of data that is being transmitted. In many networks performance can be improved by allowing certain transmitting nodes to transmit at a higher data rate than other transmitting nodes. Increasing the SINR effectively increases the data rate of the received signal, because the receiving node can process the data faster.

For example, in one embodiment transmitting nodes 104-109 are sensors. Sensors generally fluctuate in their rate of new information generated, because sensors only generate new information when the input to the sensor is changing. In method 200, therefore, each sensor is treated uniquely according to the amount of information being generated at that time. A sensor that is generating a higher amount of information receives a higher data rate of transmission. For example, in one embodiment transmitting node 104 is a video camera recording a scene. When the video camera is recording a static scene, there is little to no new information when a scene is compared with the previous scene. Nominal changes from one scene to the next can be considered as a static scene, if the difference from one scene to the next is below a threshold. When a static scene is being recorded, the data rate is not increased because it is unnecessary to transmit the static scene through network 100. When the scene is changing, however, the video camera generates new information, and the data rate may be increased depending upon the amount of new information generated. The amount of new information generated (rate of information generation) depends upon the amount of change from one scene to the next. When the video camera is generating a high amount of new information, the data rate for the video camera is increased to allow the increased data to be transmitted through network 100.

To improve network performance, therefore, method 200 continues at block 204 by determining whether transmitting node 104 should increase its SINR to increase the data rate of transmission from transmitting node 104 to receiving node 102. In one embodiment, transmitting node 104 determines whether to increase its SINR based on the amount of data to be transmitted by transmitting node 104. Here, the amount of data to be transmitted is equal to the amount of data generated by transmitting node 104.

Transmitting node 104 increases its SINR when transmitting node 104 is generating information at a rate that is greater than an average rate of information generation of all transmitting nodes 104-109 in network 100. To determine the average rate of information generation per transmitting node across network 100, transmitting node 104 is aware of the information generation rate of the other transmitting nodes 105-109. Transmitting node 104 then uses the information generation rates of the other transmitting nodes 105-109 along with the information generation rate of transmitting node 104 to calculate the average information generation rate for network 100. Transmitting node 104 calculates the average information generation rate periodically while in operation. The period with which transmitting node 104 calculates the information generation rate is set based on the desired accuracy of the calculation. A shorter period produces more accurate results, while a longer period produces less accurate results. In one embodiment, the period of calculation is varied over time. In another embodiment, in addition to the average rate of generation of information, transmitting node 104 calculates a variance and/or other statistics relating to the distribution of information.

In one embodiment, transmitting node 104 becomes aware of the information generation rate of the other transmitting nodes 105-109, because each transmitting node 104-109 broadcasts its information generation rate to each other node 104-109. In an alternative embodiment, receiving node 102 calculates the information generation rate of each transmitting node 104-109 based on the rate of information received from each transmitting node 104-109, and broadcasts the information generation rate of each transmitting node 104-109 to all transmitting nodes 104-109. In another alternative embodiment, receiving node 102 calculates the information generation rate of each transmitting node 104-109, then calculates the average information generation rate for network 100, and broadcasts the average information generation rate to each transmitting node 104-109.

Once transmitting node 104 is aware of the average information generation rate of network 100, transmitting node 104 compares its current information generation rate to the average information generation rate. If transmitting node 104 is generating information at a rate higher than the average information generation rate, transmitting node 104 increases its SINR in order to increase its transmission data rate. In one embodiment, this processes of determining whether to increase SINR occurs at transmitting node 104 by use of an internal algorithm. In an alternative embodiment, the process of determining whether to increase SINR occurs at receiving node 102. In another alternative embodiment, the process occurs at both receiving node 102 and transmitting node 104.

In one embodiment, the increase in SINR at transmitting node 104 is proportional to its information generation rate. In particular, the amount of SINR increase is proportional to the amount with which transmitting node 104 is generating information above the average information generation rate. For example, in one embodiment, the SINR of transmitting node 104 is increased such that the data rate of transmission from transmitting node 104 to receiving node 102 substantially matches the data rate of information generation at transmitting node 104. In another embodiment, the SINR for transmitting node 104 is determined based on a variance of the average information generation rate.

In one embodiment, one or more other transmitting nodes 105-109 have their SINR decreased to counter the increased noise caused by signals with increased SINR from transmitting node 104. When the SINR of transmitting node 104 is increased, the noise floor of network 100 is increased resulting in a decreased SINR for the other transmitting nodes 105-109. Thus, to counter the increase in noise floor, one or more other transmitting nodes 105-109 reduce their SINR to decrease the noise floor.

As noted above, as method 200 continues at block 206, one or more of transmitting nodes 104-109 decreases its SINR based on its rate of information generation. Here, transmitting node 105 is used for descriptive purposes, however, it should be understood that the description applies to all transmitting nodes 104-109. Transmitting node 105 decreases its SINR when transmitting node 105 is generating information at a rate that is less than the average rate of information generation of all transmitting nodes 104-109 in network 100. The average rate of information generation is determined as described above. Once transmitting node 105 becomes aware of the average rate of information generation, transmitting node 105 compares the average information generation rate of network 100 to the current information generation rate of transmitting node 105. If transmitting node 105 is generating information at a rate lower than the average information generation rate, transmitting node 105 decreases its SINR. In one embodiment, transmitting node 105 determines whether to decrease its SINR by use of an internal algorithm. In an alternative embodiment, receiving node 102 determines whether to decrease the SINR of transmitting node 105. In another alternative embodiment, the process occurs at both receiving node 102 and transmitting node 105.

In one embodiment, the decrease in SINR at transmitting node 105 is proportional to its information generation rate. In particular, the decrease in SINR is proportional to the amount with which transmitting node 105 is generating information below the average information generation rate. For example, in one embodiment, the SINR at transmitting node 105 is decreased such that the data rate of transmission from transmitting node 105 to receiving node 102 substantially matches the data rate of information generation at transmitting node 105. In another embodiment, the SINR for transmitting node 105 is determined based on a variance of the average information generation rate. Although the reduction in SINR for transmitting node 105 effectively reduces the data rate of transmitting node 105, there is little if any negative affect on network 100 since transmitting node 105 is generating information at a lower rate.

In one embodiment, the average SINR of transmitting nodes 104-109 is maintained as equal to the SINR set point of network 100. Here, the collective amount of decrease in SINR among transmitting nodes 104-109 is equal to the collective amount of increase in SINR among transmitting nodes 104-109. Thus, the average SINR of transmitting nodes 104-109 is equal to the SINR set point. This preserves the signal level in receiving node 102, which prevents saturation of its antennas. In an alternative embodiment, the SINR of one or more transmitting nodes 105-109 is less than the amount of increase in SINR of transmitting node 104, thus countering the effect of transmitting node 104, but not averaging the SINR to be equal to the SINR set point. It should be noted that in either case some transmitting nodes 104-109 may not have their SINR modified at all, if, for example, they are generating information at a rate near the average information generation rate.

Increasing the SINR of one or more transmitting nodes 104-109 in conjunction with a matching decrease in SINR of one or more other transmitting nodes 104-109 allows for more effective use of the available bandwidth without negatively impacting the overall SINR. Thus, for example, when transmitting node 104 has an information generation rate equal to the average information generation rate, transmitting node 104 transmits at the SINR set point. When transmitting node 104 has an increase in information generation rate, the SINR of transmitting node 104 is proportionally increased such that the data rate of transmission for transmitting node 104 is substantially equal to the rate of generation of information of transmitting node 104. At substantially the same time as the increase in SINR at transmitting node 104, one or more other nodes 105-109 reduce their SINR. A power control algorithm which is aware of the rate of generation of information of each transmitting node 104-109 automatically reduces the SINR of the one or more transmitting nodes 105-109 with the lowest information generation rate(s), such that the decrease in SINR of the one or more transmitting nodes 105-109 is equal to the increase in SINR of transmitting node 104. This maintains the average SINR of transmitting nodes 104-109 at the SINR set point.

It should be noted that SINR as used in this description refers to the SINR received at the receiving node. Additionally, although a modification in SINR is generally obtained by modifying the transmission power from a node, other methods of modifying the SINR are contemplated as within the scope of this description. For example, a change in location of a node relative to its receiving node can alter the SINR of the signal received because of distance to the receiving node or an interference/noise shadow.

Although method 200 has been described as having a static SINR set point throughout operation, in a complex system method 200 has a SINR set point which varies as the overall network traffic increases and decreases. The SINR set point is set to substantially match the average information generation rate of network nodes 104-109 at a particular time. Thus, for example, when transmitting node 104 has an information generation rate equal to the average information generation rate, transmitting node 104 transmits at the SINR set point. When transmitting node 104 has an increase in information generation rate, the SINR of transmitting node 104 is proportionally increased such that the data rate of transmission for transmitting node 104 is substantially equal to the rate of generation of information of transmitting node 104. At substantially the same time as the increase in SINR at transmitting node 104, one or more other nodes 105-109 reduce their SINR. In one embodiment, this occurs automatically because, all else being equal, the increase in information generation rate at transmitting node 104 causes an increase in the average information generation rate. This causes an algorithm to adjust nodes with unchanged information generation rates down in SINR because they are now below the average.

A power control algorithm which is aware of the rate of generation of information of each transmitting node 104-109 and the average information generation rate of transmitting nodes 104-109 takes into account the increased average information generation rate. The algorithm increases the SINR set point to coincide with the new average information generation rate. Thus a transmitting node 105-109 that was previously transmitting at the SINR set point and having an average rate of generation of information, now, although transmitting with the same transmission power, is transmitting below the SINR set point because the rate of generation of information is now below average. As can be seen, to maintain a proper balance among transmitting nodes 104-109, there may be slight adjustments to the transmission power of one or more transmitting node 104-109 as the SINR set point changes even if the information generation rate of the one or more transmitting nodes 104-109 does not change. This maintains the average SINR of transmitting nodes 104-109 as equal to the SINR set point and proportional to the average information generation rate of transmitting nodes 104-109.

One example of the power control algorithm is as follows, $I_{104}$ is the information generation rate of transmitting node 104, and I is the average of the rates of information generation of transmitting nodes 104-109 over network 100 calculated in a distributed fashion. Additionally, if $\sigma_I$ is the variance of the information generation rate, the SINR set point is proportional as $\alpha_I = (I_{104} - I)/\sigma_I$.

Additionally, if SINR* represents the signal to interference plus noise ratio when the received power of all transmitting nodes 104-109 is equalized at receiving node 102 (the average SINR), and $P_{104}$ is the corresponding transmit power level of transmitting node 104, then the SINR set point drives the distributed power control scheme described in the '383 application (a stable distributed power control scheme) by using feedback of the sum of all $\alpha_I$. Here, equalization power level is estimated for some minimal functionality and the SINR set point $(SINR_{104}) = (\alpha_{104}/\Sigma_{104}\alpha_{104})$ SINR*.

Although in some embodiments described above the transmission power of transmitting nodes 104-109 has been changed to improve system performance, the transmission power can be changed for other purposes as well. For example, in one embodiment, the transmission power at transmitting node 104 is randomly changed to make propagated signals difficult for an interceptor to decode. Here, an algorithm controls the power of each transmitting node 104-109 and randomly modifies the transmit power at each transmitting node 104-109 either upward or downward. In one embodiment, the algorithm makes a network wide decrease in transmitted power equal to a network wide increase in power. This enables, the system to maintain an average SINR for transmitting nodes 104-109 at the SINR set point. In an alternative embodiment, instead of randomly modifying the transmitted power of transmitting nodes 104-109 on an individual bases, the SINR set point for the system is randomly modified. Each time the SINR set point is changed, each transmitting node 104-109 modifies its transmit power to stay proportional to the SINR set point. Thus, randomly modifying the SINR set point effects a random change in the transmit power of each transmitting node 104-109.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for distributed power control in a network, the method comprising:
    determining a transmit power for a plurality of transmitting nodes such that signals sent from each of the transmitting nodes are received at a receiving node at a signal to interference plus noise ratio (SINR) set point;
    determining an average rate of information transmitted per transmitting node of the plurality of transmitting nodes;
    increasing the SINR at the receiving node of one or more transmitting nodes of the plurality of transmitting nodes; and
    decreasing the SINR at the receiving node of one or more other transmitting nodes of the plurality of transmitting nodes;
    wherein a total increase in SINR by the one or more transmitting nodes is substantially equal to total decrease in SINR by the one or more other transmitting nodes.

2. The method of claim 1, further comprising:
    determining an amount of information to be transmitted from each transmitting node of the one or more transmitting nodes to the receiving node, wherein the increase in SINR of each transmitting node of the one or more transmitting nodes is based on the amount of information to be transmitted by each transmitting node of the one or more transmitting nodes.

3. The method of claim 2, wherein the increase in SINR is based on a variance in the amount of information to be transmitted from each transmitting node.

4. The method of claim 2, wherein the decrease in SINR of each transmitting node of the one or more other transmitting nodes is based on the amount of information to be transmitted from each transmitting node of the one or more other transmitting nodes.

5. The method of claim 1, wherein the total increase in SINR by the one or more transmitting nodes is a sum of the increase in SINR of each transmitting node of the one or more transmitting nodes, and wherein the total decrease in SINR by the one or more other transmitting nodes is a sum of the decrease in SINR by each transmitting node of the one or more other transmitting nodes.

6. The method of claim 1, further comprising:
    comparing a rate of information to be transmitted from a transmitting node to the average rate of information transmitted per transmitting node of the plurality of transmitting nodes.

7. The method of claim 1, further comprising:
    modifying the SINR set point, whereby the transmit power of each transmitting node of the plurality of transmitting nodes is adjusted such that the average SINR of the plurality of transmitting nodes is substantially equal to the modified SINR set point.

8. A method for distributed power control in a network, the method comprising:
providing an average rate of information transmitted per transmitting node of a plurality of nodes;
comparing a rate of information to be transmitted from a first transmitting node of the plurality of nodes to the average rate of information transmitted per transmitting node of the plurality of nodes; and
adjusting a signal to interference plus noise ratio (SINR) of the first transmitting node based on the amount of information to be transmitted by the first transmitting node;
wherein the SINR is adjusted in proportion to a difference between the average rate of information transmitted per transmitting node and the rate of information to be transmitted from the first transmitting node.

9. The method of claim 8, wherein the rate of information to be transmitted from the first transmitting node is based on an amount of information generated at the first transmitting node.

10. The method of claim 8, wherein when the first transmitting node transmits at a rate above the average rate of information transmitted per transmitting node, the SINR of the first transmitting node is increased.

11. The method of claim 10, further comprising:
decreasing a SINR of at least one other transmitting node of the plurality of transmitting nodes, wherein a total increase in SINR by the first transmitting node is substantially equal to the total decrease in SINR by the at least one other transmitting node.

12. The method of claim 8, further comprising:
at the first transmitting node, determining the average rate of information transmitted per transmitting node of the plurality of transmitting nodes.

13. The method of claim 8, further comprising:
at the first transmitting node, receiving a signal indicating the average rate of information transmitted per transmitting node of the plurality of transmitting nodes.

14. The method of claim 8, further comprising:
setting a SINR set point such that any signals received from transmitting nodes transmitting at the average rate of information are received at a SINR set point.

15. A network comprising:
a plurality of nodes in communication with each other, a receiving node of the plurality of nodes configured to receive a signal transmitted by at least one of a plurality of transmitting nodes of the plurality of nodes, each transmitting node configured to determine a transmit power such that signals sent from each of the transmitting nodes are received at the receiving node at a SINR set point;
at least one transmitting node configured to increase its SINR; and
at least one other transmitting node configured to decrease its SINR, wherein a total increase in SINR by the at least one transmitting node is substantially equal to a total decrease in SINR by the at least one other transmitting node;
wherein each of the plurality of transmitting nodes is configured to determine an amount of information to be transmitted to the receiving node, wherein increasing the SINR of the at least one transmitting node is based on an amount of information to be transmitted, and wherein decreasing the SINR of the at least one other transmitting node is based on an amount of information to be transmitted;
wherein a SINR of a signal received by the receiving node is proportional to the amount of information to be transmitted;
wherein each transmitting node determines an average rate of information transmitted per transmitting node of the plurality of nodes.

16. The network of claim 15, wherein determining an amount of information determines a rate of information to be transmitted.

* * * * *